May 28, 1935.  O. SCHREYER  2,002,588
MACHINE FOR AFFIXING TWO-PART SEALS TO STRING
Filed Sept. 25, 1933  8 Sheets-Sheet 1

Inventor.
Oscar Schreyer.
per Ferdinand Broster Bosshardt
Attorney May 28, 1935. O. SCHREYER 2,002,588
MACHINE FOR AFFIXING TWO-PART SEALS TO STRING
Filed Sept. 25, 1933 8 Sheets-Sheet 4

Inventor.
Oscar Schreyer.
per Ferdinand Brater Bosshardt
Attorney.

May 28, 1935.　　　　O. SCHREYER　　　　2,002,588
MACHINE FOR AFFIXING TWO-PART SEALS TO STRING
Filed Sept. 25, 1933　　　8 Sheets-Sheet 5

May 28, 1935. O. SCHREYER 2,002,588
MACHINE FOR AFFIXING TWO-PART SEALS TO STRING
Filed Sept. 25, 1933 8 Sheets-Sheet 7

Inventor.
Oscar Schreyer,
per Ferdinand Broter Bosshardt
Attorney.

Patented May 28, 1935

2,002,588

UNITED STATES PATENT OFFICE 2,002,588

MACHINE FOR AFFIXING TWO-PART SEALS TO STRING

Oscar Schreyer, Horn, Thurgau, Switzerland, assignor to Hans Stoffel and Franz Leo Stoffel, Horn, Thurgau, Switzerland, trading as Stoffel & Sohn Application September 25, 1933, Serial No. 690,960
In Switzerland October 25, 1932

19 Claims. (Cl. 153—1)

This invention relates to machines for affixing two-part seals to strings and has for its object to enable the attachment of one seal after another to be effected automatically in a speedy manner.

This object is attained by the mechanism hereinafter described and claimed.

For the purpose of description of the mechanism, reference is had to the accompanying drawings, in which—

Figure 36 is a detached side view of a detail thereof.

Figures 1, 2, 3:
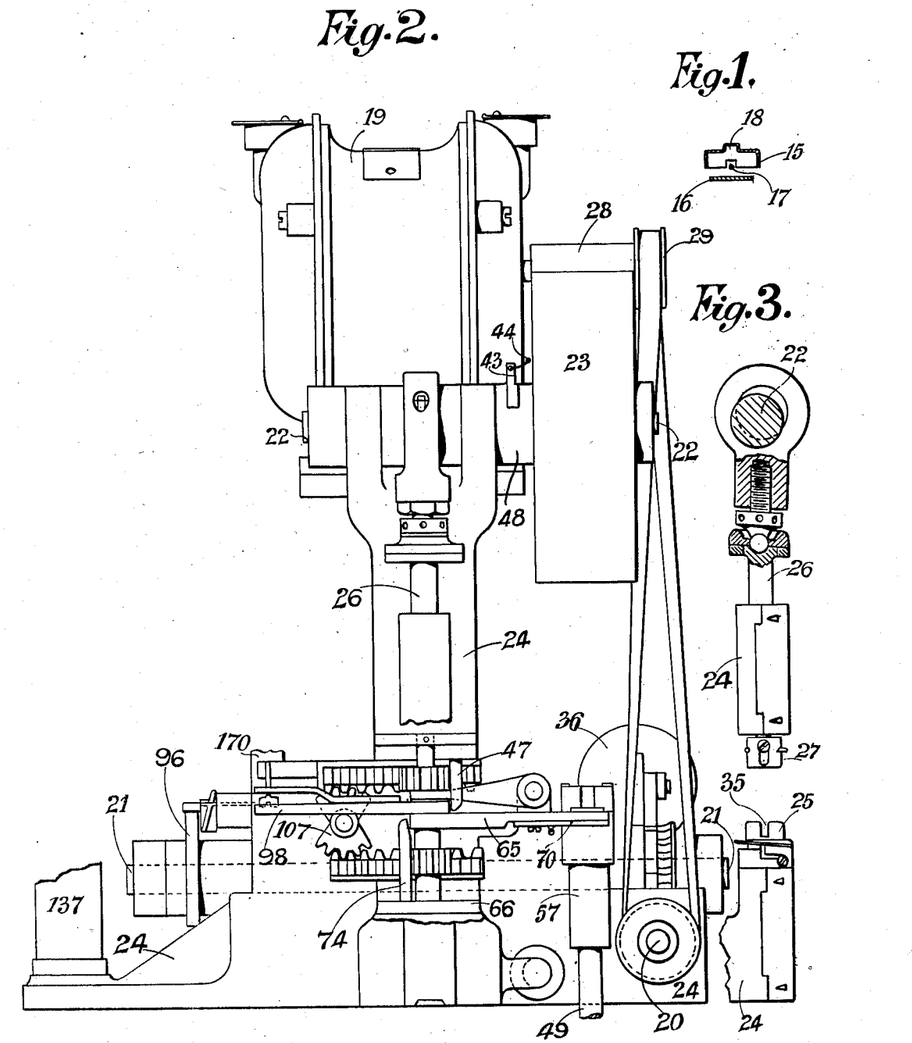
Figure 1 is an elevation of the separate parts of a two-part seal and the string or wire before attachment.
Figure 2 is a front elevation of an automatic machine for attaching the said seal, with parts of the machine broken away.
Figure 3 is a fragmentary side view partly in section of seal-closing mechanism of the machine.

Referring to Figure 1, the illustrated two-part seal consists before sealing of a capsule 15 and a disc 16. The capsule 15 has two diametrically arranged slots in which is laid the string 17 to which the seal is to be attached so that the string 17 lies in the cavity 18 when the disc 16 has been placed in the capsule 15 and the edges of the capsule have been turned over inwardly onto the disc 16. The string 17 is caused thereby to have sharp bends. Seals of this kind can be attached by placing the parts thereof on the string by means of a hand-operated pair of pincers or a sealing apparatus.

According to the present invention the placing of the seal parts on the string is avoided by the provision of an automatic sealing machine, one constructional example of which is shown in the drawings.

Figures 5, 6, 7, 8, 9:
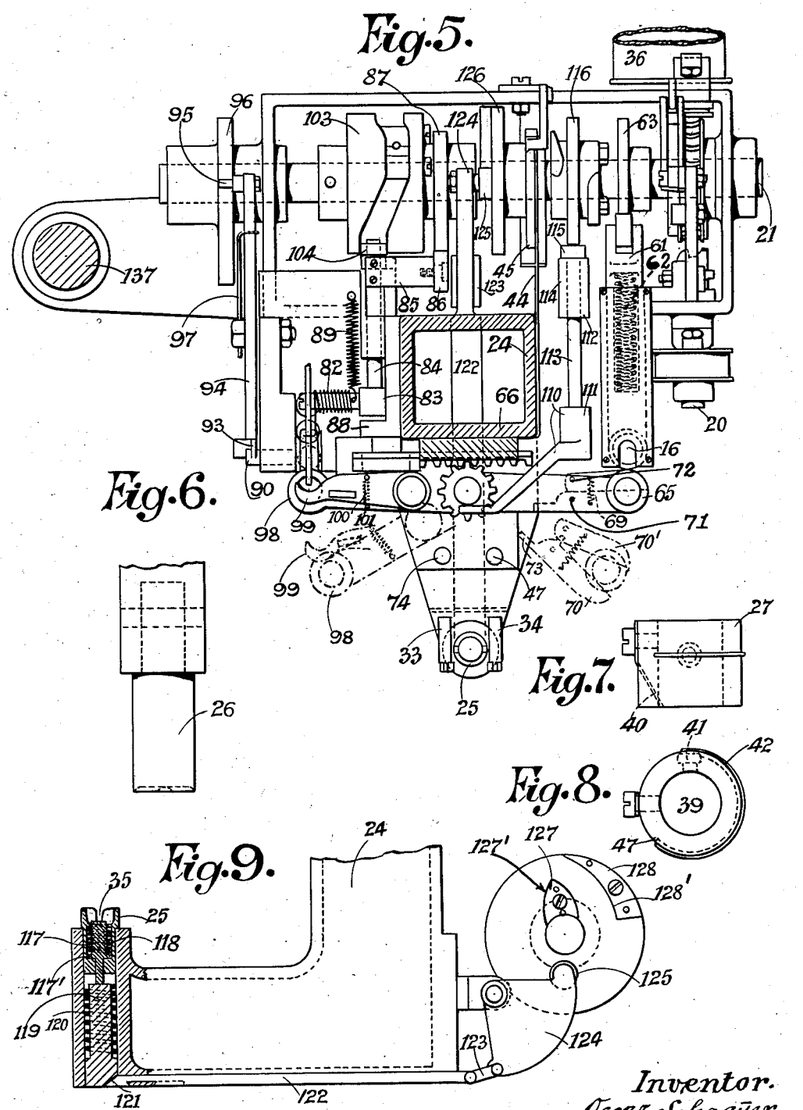
Figure 5 is a plan view partly in section of the machine.
Figure 6 is a detached, fragmentary front elevation of a detail of the seal-closing mechanism.
Figure 7 is a detached front elevation.
Figure 8 a detached plan view of another detail of the seal-closing mechanism.
Figure 9 is a fragmentary side view, partly in section illustrating other details of the seal-closing mechanism.
Figure 10:
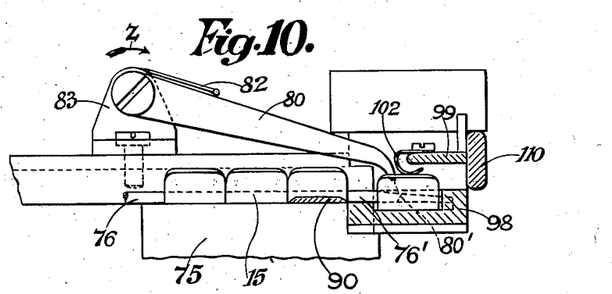
Figure 10 is fragmentary side view, partly in section of the feed mechanism provided on the machine for feeding the first named part of the seal.
Figures 17, 18:
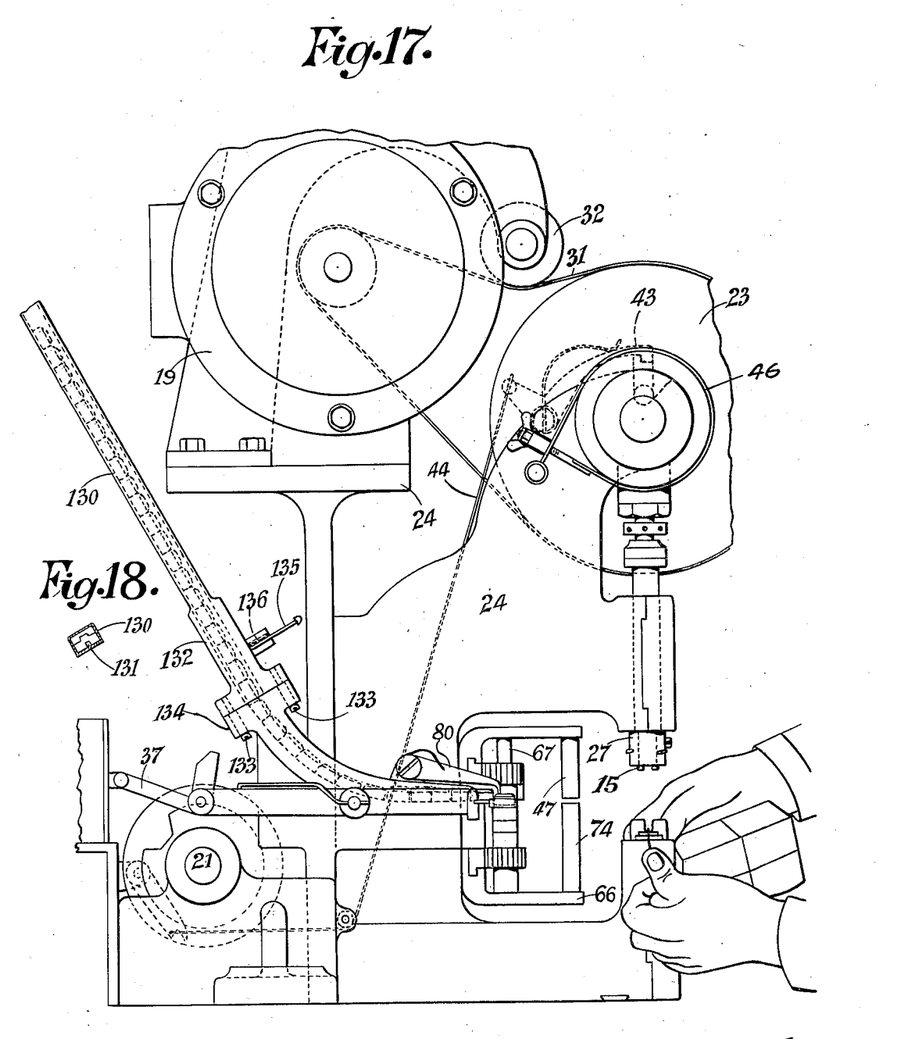
Figure 17 is a side elevation of the machine.
Figure 18 is a detached cross-section of the magazine which holds the first named part of the seal.

19 is the motor, 20 is a countershaft, 21 a cam shaft, 22 a crank shaft provided with a flywheel 23 at one end. At the forward part of the machine frame 24 there is provided a lower die 25 which serves to receive the disc 16. A capsule holder 27 is situated vertically above the lower die 25 and is mounted on a vertically reciprocatable upper die 26.

There are three driving pulleys 28, 29 and 30 on the motor 19. The driving pulley 28 is connected by a strap 31 to the flywheel 23, a tensioning pulley 32 being provided to act on the strap 31. When the motor is running, the flywheel turns loosely on one end of the crank shaft 22.

Beneath the die 25 there are two contacts 33 and 34. When the string to be sealed is laid in a slot 35 provided therefor in the die 25, the contacts are pressed downwards by the string and close an electric circuit which energizes an electromagnet (not shown) contained in the drum 36. The electromagnet thereupon attracts an armature (not shown) which moves a rod 37, Figure 16, in the direction of the arrow 38. The movement of the rod 37 engages a coupling in the usual manner to set the cam shaft 21 in motion for a single rotation and to then automatically disengage the coupling.

The starting of the machine can be effected in any other suitable manner, for example by means of a pedal which when depressed, displaces the rod 37 by means of a cable and arrangement of levers.

The employment of two contacts 33, 34 instead of only one which would be sufficient for the purpose has for its object to ensure that the engagement of the coupling can only take place after the string has been fully and correctly inserted in the slot 35 of the die 25. The provision of two contacts arranged as shown also guards against accidents, such as injury to the fingers because the upper die can only descend when the fingers of both hands are lying at the side of the lower die and therefore cannot be in the way of the upper die. Where two contacts are provided the electrical connections are such that the depression of one contact only does not cause the electromagnet to be energized, but that depression of both contacts is necessary to achieve this effect.

A string can only be sealed by means of the two-part seal when the string is situated between the disc and the capsule of the seal. The disc, which is usually provided with a name of a trader or the like is accommodated in the die 25. The capsule must however be placed above the die 25 in a position where its slots will register with the string laid in the die 25. To attain this position, the capsule holder 27 is provided with a spring 40 secured externally and projecting with its lower end into the cavity 39. The diameter of the cavity 39 corresponds with that of the capsule.

Therefore, after the capsule has been inserted in the cavity from below with the opening of the capsule pointing downwards, the spring 40 retains the capsule in the cavity. The capsule holder 27 is so fixed on the upper die 26 that it cannot slip off the same. For this purpose a movable stud 41 is provided on the holder 27 and is pressed inwardly by a spring 42 situated in a groove 47, the stud 41 being thereby pressed against the upper die 26.

The capsule must be laid in the holder with the string recess 18 in a position where it will register with the string slot 35 in the die 25. The slot 35 and the recess 18 must therefore both lie in the same vertical plane to enable correct sealing to take place.

The capsule can be forced out of the lower part of the cavity by means of the falling die 26 as soon as the lower edge of the holder 27 impinges against the upper edge of the die 25. Continued downward movement of the die 26 attaches the two parts of the seal to the string by causing the string to enter the slots in the capsule 15, causing the disc 16 to enter the capsule 15, bending the string into the recess 18 and beading that part of the capsule rim which extends downwards beyond the disc 16 inwards and against the said disc. When the attachment operation is complete the capsule holder 27 is situated at the upper part of the die 26.

The holder 27 is returned to its initial position on the die 26 by impingement against the machine frame 24, see Figure 3 which arrests the upward movement of the holder 27 during the upward return movement of the die 26.

Not only the cam shaft 21 and the countershaft 20 must perform a single revolution after coupling with the constantly rotating motor 19, but also the crank shaft 22 must also perform only a single revolution at a higher speed than the other shafts and stop after each seal has been attached. The crank shaft is therefore arranged separate from the cam shaft 21. The crank shaft 22 effects the vertical reciprocatory movement of the die 26. To control the motion of the crank shaft 22 a spring housing 43 is arranged at the side of the fly wheel 23 and has a pawl 43 which projects therefrom and is connected to a Bowden cable 44 which is controlled by a cam 45. The cam 45 pulls the cable 44 immediately after the cam shaft has commenced to rotate and the pawl 43 thereupon acts on cam (not shown) situated in the spring housing and serving to lock the fly wheel and crank shaft together and thereby establish a driving connection between them for one revolution and thereupon automatically unlock the crank shaft from the fly wheel. A band brake 46 is provided in connection with the crank shaft 22 and ensures immediate stoppage of the crank shaft when it has been unlocked from the fly wheel.

The discs of the seal are fed to the die 25 by means of a longitudinally slit tube 49 which extends downwardly and serves as a magazine for the discs. The discs are arranged in a pile in the tube 49. They are pressed upwardly against a stop 55 by means of a slide 50 which has a hook 51 connected to a weight 54 by means of a cord 53 which rides on a roller 52. There is room for only one disc between the stop 55 and the upper edge of the end of the tube 56. The tube 56 has a collar 57 at one end and the collar has a bayonet slot 58 by means of which it can be slipped off a pin 59 fixed to the machine frame.

A disc feed plate 60 is reciprocatably mounted between the upper edge of the magazine tube 56 and the stop 55. The feed plate 60 is secured to a horizontally mounted, rectangular rail 61 which is acted on by a spring 62 situated in a cavity of the machine frame 24. The rail 61 has a roller at its rear end to ride on a cam 63 and be maintained in contact therewith by the action of the spring 62. When this rail is actuated by the thrust of the cam 63, that seal disc which lies in front thereof is pushed off the pile into the hole 64 of a disc feed lever 65.

A U-shaped bracket 66 is secured to the front of the machine frame 24 and carries a vertical spindle 67 to which the lever 65 is secured. The lever 65 makes a quarter turn from the disc receiving position into a position where the disc carried thereby lies in the space between the die 25 and the die 26.

The hole 64 of the lever 65 is of the same diameter as the seal disc 16. The lever has a divided platform 70, 70' the two parts of which are held together by a spring 69 and thereby normally prevent the disc from falling through the hole 64. The platform comprises the two parts 70, 70' pivoted at 71 and 72 respectively and provided with meeting knife edges. The part 70 has an extension 73 which is adapted to impinge against a stop 74 and thereby separate the two parts to allow the disc to fall through the hole 64 into the cavity of the die 25.

The seal capsules are fed by hereinafter described means onto a horizontal support 75 with the string recesses uppermost. A capsule feed lever 98 is secured to the shaft 67. A rail 76, 76' having a slanting surface extends along and beyond the support 75 into a cavity 77 in the lever 98. A projection 78 is provided in the cavity to form an extension of the projecting part 76' of the rail 76, 76'. The projecting part 76' and projection 78 are so shaped and arranged that the capsules ride thereon by means of their slots 79. The feed of successive seal capsules onto the slanting surface of the part 76' and the projection 78 is effected by means of a pivoted finger 80 the point 80' of which engages one of the holes 81 provided in each capsule. The finger 80 is loaded by a spring 82 which acts to turn the finger in the direction of the arrow Z. The finger performs a horizontal feed movement because its support 83 is mounted on a slide having a roller which rides on a cam 87. The slide 84 and support 83 move towards a stationary part 88 without actually impinging thereon.

The slide is acted on by a spring 89 which keeps the roller in contact with the cam 87.

Figures 11, 12, 13, 14, 15, 16:
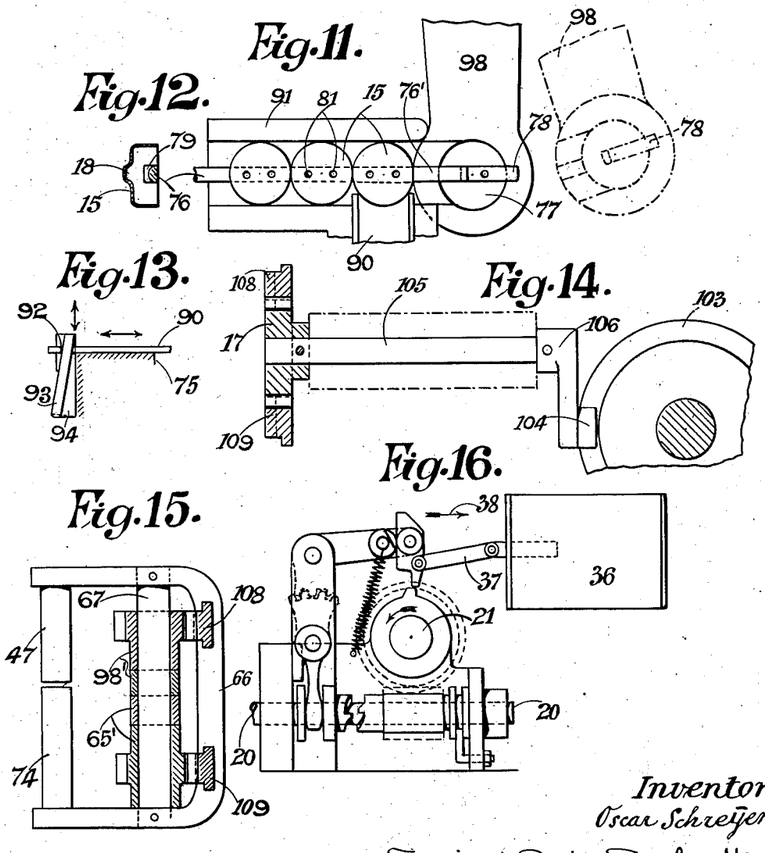
Figure 11 is a fragmentary plan view of the last named feed mechanism.
Figure 12 is a detached cross-section of a part of the last named feed mechanism.
Figure 13 is a fragmentary front view, partly in section and illustrates details of the last named feed mechanism.
Figure 14 is a detached side view, partly in section of part of the drive of the last named feed mechanism.
Figure 15 is a detached side view, partly in section of another part of the said drive.
Figure 16 is a detached side view of the starting and stopping mechanism of the machine.

The seal capsules, which are acted on by pressure from the rear, are prevented from leaving the support prematurely and are caused to be fed singly to the cavity 77 of the lever 98 by means of a movable tongue 90, Figure 13, which acts at the correct time to press the capsule laterally against a guide wall 91. The tongue 90 is in the form of a flat, rectangular plate and has a slot 92 engaged by a slanting cam piece 93 provided on a lever 94 which is mounted on the machine frame 24 and has a pin 95 riding on a cam 96. Contact of the pin 95 with the cam is maintained by a spring 97.

A lever 99 is mounted on the lever 98 and is acted on by a spring 100 which draws it towards a stop 101, the spring 100 being arranged to become relaxed at the moment that the lever 99 impinges against the die 25. On the lever 99 there is a thin wire spring 102 which presses downwardly on the seal capsule carried by the lever 98.

A positive cam 103 is mounted on the shaft 21 and acts on a roller 104 provided on a lever 106 which is mounted on a shaft 105. The shaft 105 is journalled in the machine frame 24 and has a double, toothed segment 107 one part of which meshes with a rack 108 and the other part of which meshes with a rack 109. The racks are guided in the bracket 66 and each has an additional row of teeth situated at the front. The front rows of teeth respectively mesh with pinions 65' and 98' which are welded on the seal disc feed lever 65 and the seal capsule feed lever 98 so that the parts move synchronously.

The levers 65 and 98 turn simultaneously into and out of the space between the die 25 and the holder 27 and the lever 98 impinges on the pin 47 when it arrives in the said space.

A lever 110 engages beneath a projection on the lever 98 and is designed to force the lever 98 axially upwards for the purpose of forcing the seal capsule carried by the lever 98 into the holder 27. The lever 110 is mounted on a shaft 113 which is journalled in bearings 111 and 112. A lever 114 is secured to the shaft 113 and carries a roller 115 which is acted on by a cam 116 to operate the lever 114 in the requisite manner.

For the purpose of ejecting the seal from the die 25 after it has been affixed to the string, there is a plunger 117 provided in the die 25 and acted on by a spring 118 which is situated between the shoulder 117' and the head of the die. There is also a bolt 119 which is acted on by a compression spring 120 which keeps a slanting surface 121 on the bolt 119 in contact with a correspondingly slanting surface on a horizontally slidable rod 122. A pivotal link 123 connects the rod 122 to a lever 124 which has a roller acted on by a positive cam 126 mounted on the shaft 21. The cam 126 has two parts 127 and 128. The surface 127' of the part 127 acts on the roller 125 to displace the rod 122 forwardly and the surface 128' of the part 128 acts on the said roller to displace the rod 122 rearwardly.

For the purpose of supplying seal capsules to the support 75 an interchangeable capsule magazine 130 is provided. There are several of these magazines for use in succession on the machine and each of them has a guide rail 131 along which ride the capsules contained in the magazine. The rail engages the string slots in the capsules. Each magazine has a flange 132 provided with positioning pins 133 by the aid of which the magazine is removably attached to a flange 134 provided on the machine frame 24. A bolt 135 is provided on the flange 132 and has a spring 136 which holds the bolt against accidental disengagement. The bolt projects into the magazine during transport of the filled magazine and prevents the capsules from falling out during transport and whilst the magazine is being placed in position. When the magazine is in position, the bolt 135 is removed by hand and is thereby withdrawn from the path of the capsules which are then free to travel downwards. If the capsules are very light, a weight of the same shape as the cross-section of the channel in the magazine can be slipped into the top of the channel so that it presses the capsules down the channel.

Instead of a number of interchangeable handfilled magazines for the seal capsules, the said capsules may be supplied automatically by means of an automatically acting mechanism mounted on a pillar 137 which is adapted to be suitably secured to the machine frame 24. The pillar is provided at the top with a cavity and terminates in a flange 138.

Figure 2A:
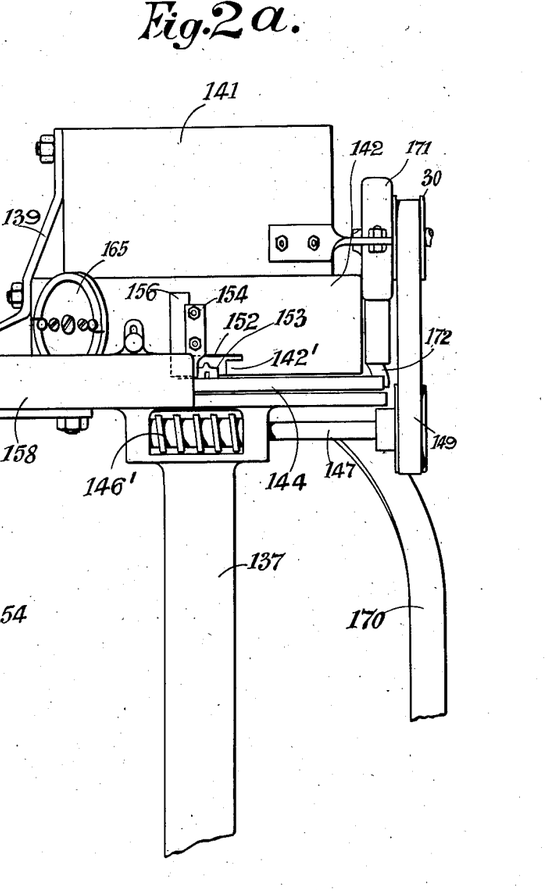
Figure 2a is a front elevation of an arranging device for one part of the seal.
Figure 4:
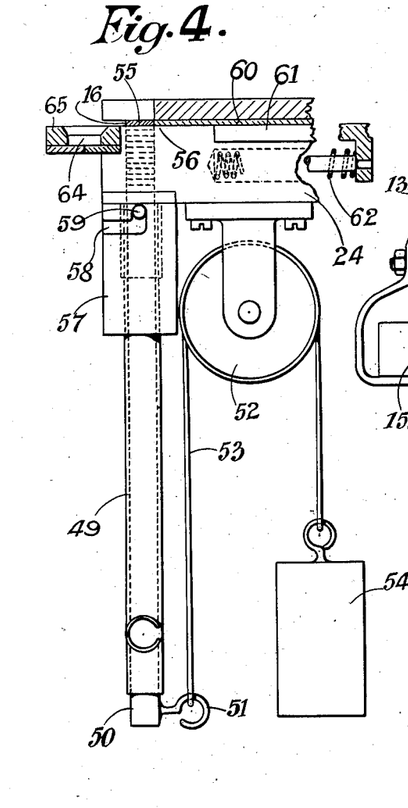
Figure 4 is a fragmentary side view partly in section of the feed mechanism which feeds the second part of the seal.
Figures 19, 20, 21, 22, 23, 24:
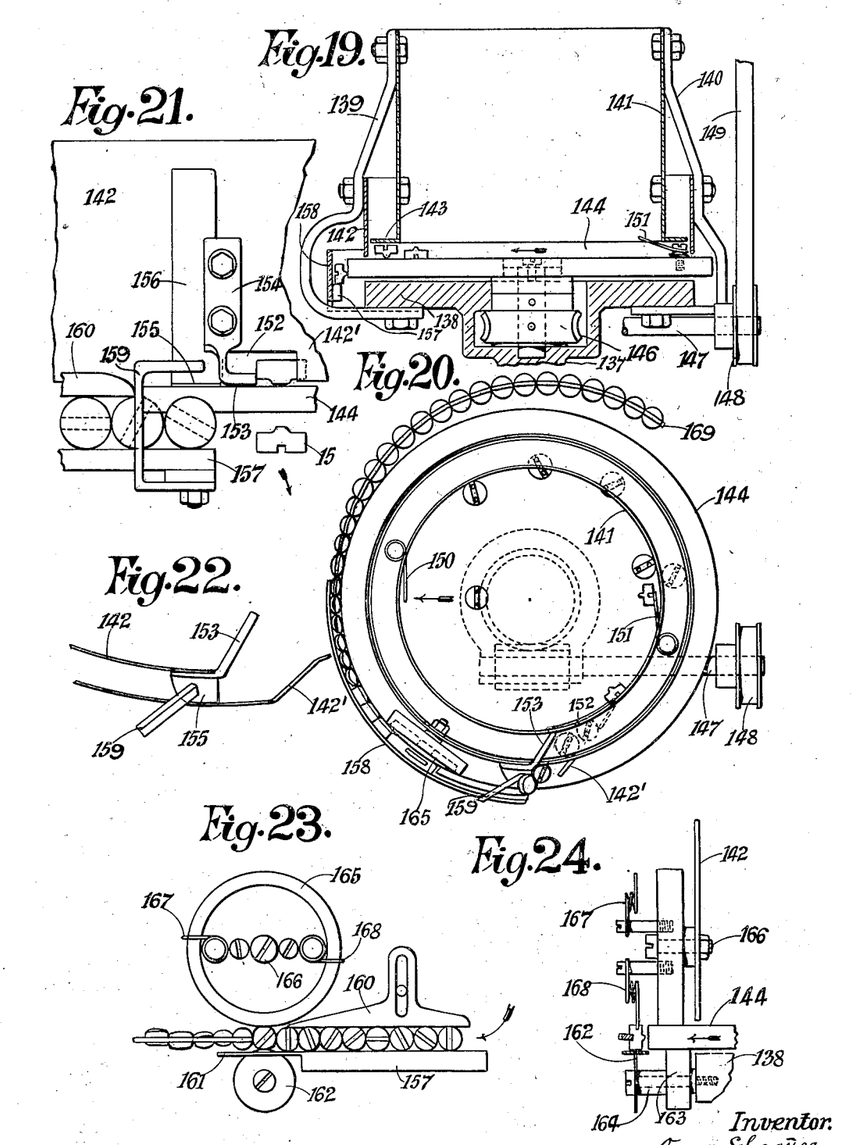
Figure 19 is a front view in vertical section of the arranging device for the first named part of the seal.
Figure 20 is a plan view of the said arranging device.
Figure 21 is a fragmentary front view of a part of the said arranging device.
Figure 22 is a fragmentary plan view of part of the said arranging device.
Figure 23 is a detached front view.
Figure 24 a fragmentary side view of the row-forming mechanism of the arranging device.

Two concentric cylinders 141 and 142 are mounted on the flange 138 by means of brackets 139 and 140. The cylinder 141 has a rim 143 which extends towards the cylinder 142. A rotary disc 144 is situated beneath the rim 143. The disc 144 is provided with a worm wheel 146 which meshes with a worm 146' situated in the cavity of the pillar 137. The shaft 147 of the worm extends outside the pillar 137 and is provided with a driving pulley 148 which is connected by a strap 149 to the pulley 30 of the motor 19. Two diametrically arranged springs 150 and 151 are secured to the rotary disc 144. The cylinder 142 is provided with an aperture 152. A rail 153 is secured to the cylinder 142 and projects through the aperture 152, the rail lying very slightly above the disc 144. A tongue 142' is provided on the cylinder 142 and is approximately parallel to the inwardly directed part of the rail 153. A deflecting strip is secured, together with the lug 154 of the rail 153 to the cylinder 142 near the outlet of the aperture 152. It has a part 155 extending only slightly over the disc 144. A sector-like rail piece 157 extends outside the flange 138 in a parallel manner. The rail piece 157 is outwardly encased by a muff 158. A finger 159 is situated near the aperture 152 and extends over the end of the rail 157. Above the rail 157 there is a locking piece 160 which is situated above the rail 157 at a distance equal to the diameter of the seal capsule. The rail 157 is so shaped that its upper surface has a downward slant relative to the disc 144.

The rail 157 is continued by a small, flat plate 161 which has a slot through which a thin disc 162 extends. The disc 162 has a boss to which a rubber roller 163 is secured, the disc and roller being mounted on a stud 164 so that the roller is frictionally driven by the disc 144. The stud 164 is fixed to the flange 138. A friction roller 165 is mounted in contact with the upper surface of the disc on a stud 166 secured to the cylinder 142. Two diametrically arranged springs 167 and 168 are secured to the roller 165. A stationary, rectangular rail 169 extends over the plate 161 and extends in a spiral direction round the disc 141 to finally slant downwardly into the magazine 130 which is connected to the support 75. The lower end of the rail 169 is indicated by the reference 76.

At one side of the pulley 39 there is an air blower 171. The blower discharges through an outlet 172 which guides the draught of air against an open part of the magazine 130.

In operation, the seal capsules are thrown into the cylinder 141 and are forced by centrifugal action by the disc 144 rotating in the direction of the arrow, against the inner side of the cylinder 141. Only those capsules which lie in inverted positions or in upright positions can slip under the wall of the cylinder 141 and arrive beneath the rim 143.

Those capsules which roll or lie on their sides inside the cylinder 141 eventually impinge against one or the other of the springs 150 and 151 during the rotary movement of the disc 144 and the springs disturb their positions until they finally assume an inverted or upright position on the disc 144 and are thereby rendered capable of slipping beneath the rim 143. Those capsules which are forced by the centrifugal action against the inner side of the cylinder 142 are pushed by rotation of the disc 144 against the rail 153 and are guided by the same out of the cylinder 142 and along the guide member 142' towards the periphery of the disc 144. Those capsules which are in inverted positions, that is to say, which have their rims projecting upwardly then impinge successively against the part 155 of the strip 156 and fall from the disc 144 into a container from which they are again thrown by hand into the cylinder when the container has become full. Those of the capsules which leave the disc 144 in the correct position, namely with their rims extending downwardly slide over the part 155 and are slightly tipped up by the correspondingly slanting finger 159 and fall onto the rail 157 so that they lie on their sides, see Figures 20 and 21. The closed ends of the capsules then lie in contact with the periphery of the disc 144. The rail 157 is bent circularly in a manner concentric with the disc 144. The top of the rail 157 inclines downwardly in the direction towards the flange 138 and the closed ends of the capsules are thereby caused to rest against the disc 144 and to be conveyed along the rail 157 by the friction between their closed ends and the periphery of the disc 144.

To prevent one capsule from mounting on the preceding capsule owing to jamming of a capsule, a stop rail 160 is secured to the inner side of the muff 158. The muff 158 prevents the capsules from jumping away from the rail 157.

Only one capsule arrives at a time on the plate 161 and at this point the capsules lie exactly one behind the other. The thin disc 162 is rotated by the friction roller 163, and the friction roller 165 is rotated vertically above the disc 162. The springs 167 and 168 assist the disc 162 to rotate that capsule which lies vertically over the disc 162 and the rotated capsule thereby reaches a circular or angular position in which the diametrical slots in the capsule lie horizontally opposite each other. This capsule can then be slid onto the rail 169 with its slots engaged by the said rail, under the pressure exerted by the succeeding capsules. The rail 169, due to its being twisted and of helical form, causes the capsules arriving thereon to travel downwards and be turned thereby, the movement of the capsules being due partly to the downward slant of the rail, partly to the pressure exerted by the succeeding capsules and partly by the draught of air created by the blower 171. The capsules therefore arrive in the magazine 130 and travel to the feed lever 98 which transfers them singly to the holder 27.

The capsule magazine 130 can be filled independently of the operation of the other parts of the machine, and therefore the filling can take place whilst the cam shaft 21 is stopped and the dies are inoperative.

The hereinbefore described machine is obviously subject to changes or modifications within the spirit of the invention.

The seal ejecting mechanism can be completely omitted from the machine.

Figures 25 to 38 illustrate an alternative construction of capsule feeding means and an alternative construction of capsule retaining means.

Figures 25, 26, 27:
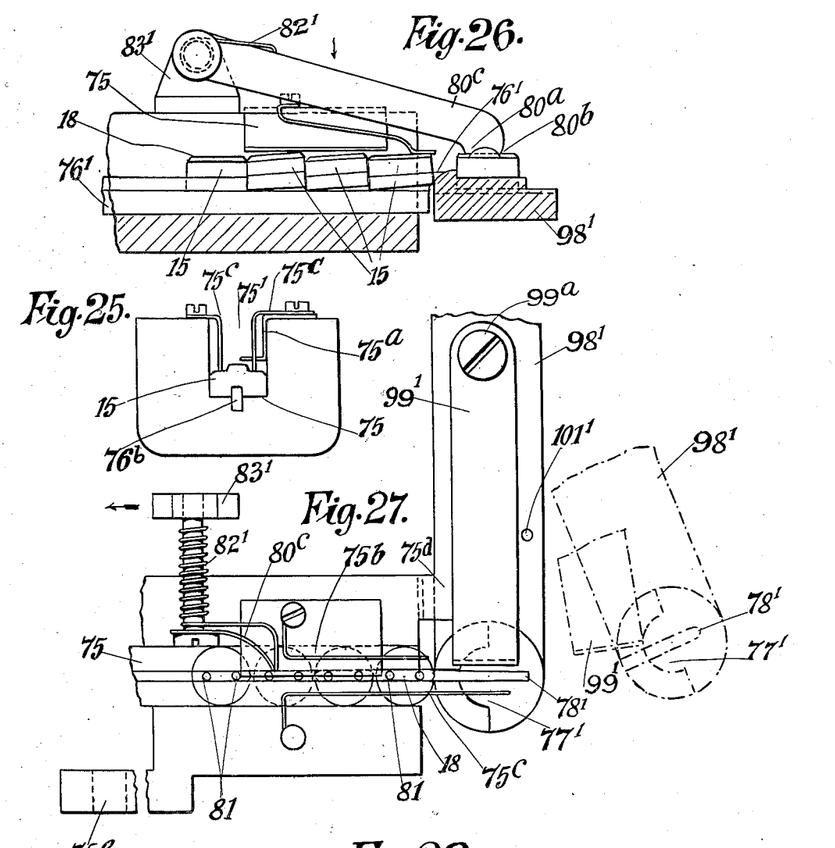
Figure 25 is a detached end view of an alternative construction of capsule guide.
Figure 26 is a front view in section thereof.
Figure 27 is a plan view of the same.

In the construction shown in Figures 25 to 27, there is a horizontal feedway provided with a projecting rail 76' which is provided with saw like teeth at its delivery end. The teeth are spaced to accommodate one capsule 15 in each tooth gap. The delivery end of the rail 76' has an upwardly slanting upper surface which extends beyond the feedway 75. A pivotal gripper arm 80c is provided with a tooth 80a and a tooth 80b which simultaneously engage the two holes 81 in each capsule as it arrives at the end of the rail 76'. The gripper arm 80c is loaded by a spring 82' which acts in a downward direction as indicated by the arrow of Figure 26. The gripper arm 80c is mounted on a slide 83' which reciprocates horizontally.

A check rail 75a is provided above the capsules 15 to limit movement in an upward direction. Springs 75b and 75c are provided to yieldingly load the capsules 15 as they arrive in position thereunder, the spring 75b acting on each capsule as it reaches the end of the rail 76' and the spring 75c acting on each capsule when delivered to the transport arm 98'.

Figures 28, 30, 31, 32, 33, 34, 35, 37, 38:
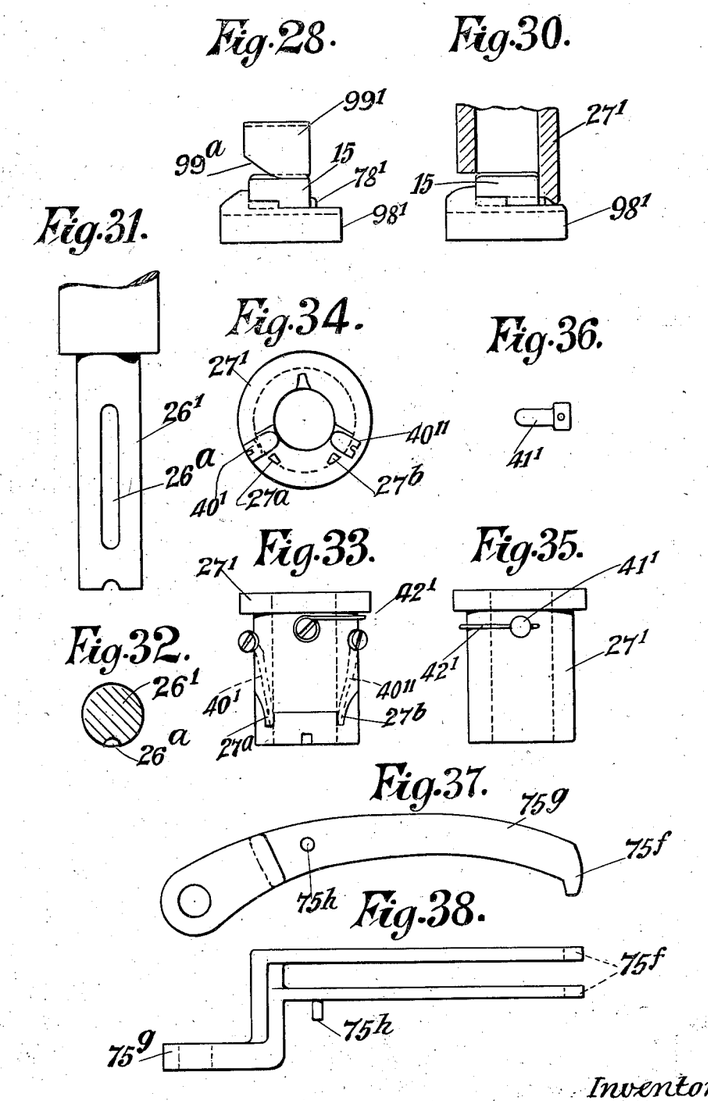
Figure 28 is an end view of an alternative construction of capsule feed arm.
Figure 30 is an end view of the said arm when in another working position.
Figure 31 is a detached front view of an alternative construction of sealing plunger.
Figure 32 is a detached plan view in section thereof.
Figure 33 is a detached side view of an alternative construction of capsule retaining member.
Figure 34 is a detached plan view of the said retaining member regarded from below.
Figure 35 is another detached side view thereof.
Figure 37 is a detached side view of a weighting arm.
Figure 38 is a detached plan view thereof.

A capsule weighting arm pivoted on the lug 75e, see Figure 27, can be employed instead of the springs 75b and 75c. A suitable weighting arm 75g is shown in Figures 37 and 38 and is bifurcated and provided with fingers 75f which engage the end capsule 15 on both sides of the recesss 13 thereof and thereby prevent it from prematurely leaving the channel 75'. A stop 75h is provided on the arm 75g to impinge on top of the side wall of the channel 75' and thereby prevent the weighting arm 75g from falling too far when the last capsule leaves the channel 75'.

Figure 29:
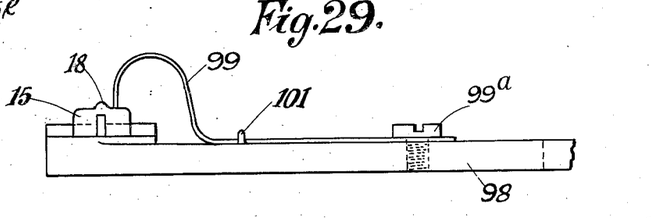
Figure 29 is a fragmentary side view of the said arm.

The transport arm 98' has at its end a semicircular recess 77' of the same radius as the capsule 15. This gap has a serrated rail piece 78' projecting through it. When the conveyor arm 98' is in the position shown in full lines in Figures 26 and 27, the rail piece 78' forms a continuation of the rail 76'. A spring 99', Figures 27 and 29, is provided on the transport arm 98' and is oscillatable on the screw 99a but its oscillatory movement in one direction is limited by a stop 101' on the arm 98'. A stop 75d, Figure 27, is provided to act on the spring 99'.

In the construction of capsule retaining member shown in Figures 33 to 35, a collar 27' is adapted to be slidably but non-turnably mounted on the sealing plunger 26' shown in Figures 31 and 32 by the aid of a pin 41', Figure 36 which engages a slot 26a in the plunger 26'. The pin 41' is pressed in the slot 26a by a spring 42' attached to the collar 27'. The collar has a lateral gap at its lower end to enable the capsule to enter the same in a lateral direction when conveyed by the transport arm 98' to the collar 27', see more particularly Figure 30. Springs 40' and 40'' are provided on the collar and act through axial gaps in the collar to yieldingly press radially on the capsule and thereby retain it in position in the end of the collar until driven out of the collar by the plunger 26'. The finger-like parts 27a and 27b of the collar guide the ends of the springs in the requisite radial directions and also assist in ensuring an easy entrance of the capsule through the lateral gap.

The last described construction of mechanism operates as follows:—

The capsules 15 are fed singly by the gripper arm 80c from the channel 75' onto the transport arm 98'. The springs 75c and 75b, or alternatively the weighting arm 75g prevents more than a single capsule from leaving the channel at a time.

When the gripper arm 80c returns to its initial position, the toothed formation of the end of the rail 76' prevents the said arm from conveying the capsule in the reverse direction. The said toothed formation also prevents others of the capsules in the channel 75' from moving in the reverse direction. The gripper arm 80c forces the capsule under the spring 99' which has a slanting part 99a to facilitate this. When the gripper arm 80c has returned to the initial position, the transport arm oscillates 90 degrees and the spring 99' holds the capsule on the arm during this movement. At the end of the oscillation of the arm 98', the spring 99' impinges against the collar 27' and is moved thereby into the position shown on the said arm in broken lines in Figure 27.

The arm 98' carries the capsule laterally into the collar 27' and the springs 40' and 40'' are forced apart by the capsule as it enters the said collar. The springs 40' and 40'' then press against the capsule and hold it frictionally in position in the collar until the plunger 26' descends through the collar and forces the capsule therefrom and closes the capsule on the disc of the seal. On the return movement of the transport arm 98', the spring 99' is forced by the projection 75d into its initial position which is shown in full lines in Figure 27.

I claim—

1. An automatic machine for affixing the capsule and disc of a seal to a spring placed in the machine, comprising a fixed affixing die having a cavity for the disc and slots for the string, a movable affixing die cooperating with the first named affixing die, the said dies being situated in a freely accessible space, capsule holding means on the movable affixing die for holding the capsule in position on the second named die, a feed member for inserting the capsule into the second named affixing die and a feed member for depositing the disc in the cavity of the first named die.

2. An automatic machine according to claim 1, comprising a magazine for a plurality of the said capsules, a guide rail in the magazine bestraddled by the capsules singly for angularly positioning the capsules, a feed finger for forcing the capsules singly out of the magazine onto the first named feed member, means for reciprocating the feed finger, and a rail piece on the first named feed member for the received capsule to bestraddle.

3. An automatic machine according to claim 1, comprising a capsule feed lever which constitutes the first named feed member, a spring arm provided on the feed lever for yieldingly holding the capsule on the said lever, a spring on the said lever for yieldingly clamping the capsule to the lever against being thrown from the lever during actuation thereof, and impingement means for automatically displacing the spring arm and spring away from the capsule when the said lever has fed the capsule into position beneath the first named die.

4. An automatic machine according to claim 1, comprising a capsule feed lever for feeding capsules singly to the first named die, a capsule holder provided on the first named die, an inserting lever for forcing the capsule carried by the feed lever upwards into the holder, and means for actuating the inserting lever.

5. An automatic machine according to claim 1, comprising a cam shaft for actuating the feed members, driving means for driving the cam shaft, an upper affixing die and a lower affixing die in which the string is laid, and electric switch contact means provided adjacent the lower affixing die for closure by the operation of laying the string in the lower die, coupling means for coupling the driving means to the cam shaft, and electromagnetic coupling controlling means energized by closure of the switch contact means.

6. An automatic machine according to claim 1, comprising a disc feed lever, means for moving the disc feed lever into position over one of the dies, a two-part displaceable platform on the feed lever for supporting the disc thereon, and automatic operating platform displacing means for discharging the disc from the disc feed lever into the said die.

7. An automatic machine according to claim 1, comprising a horizontally oscillatable and vertically movable capsule feed lever, stationary stop means for limiting the oscillatory movement of the lever, a capsule holder on one of the said dies, a lifting lever for raising the feed lever when in one end oscillatory position beneath one of the said dies and thereby push a capsule into the holder, and means for actuating the lifting lever.

8. An automatic machine according to claim 1, comprising a stationary affixing die, a movable affixing die in alignment with the stationary die, means for actuating the movable die towards and away from the stationary die, a capsule feed lever mounted to one side of the said dies, a disc feed lever mounted to the other side of the said die, means for actuating the said feed levers simultaneously in their feed directions immediately after the movable die actuating means has moved the movable die away from the stationary die.

9. An automatic machine according to claim 1, comprising a movable affixing die, a stationary affixing die, an ejector plunger provided in the stationary die, and means for positively actuating the ejector plunger in an ejecting direction.

10. An automatic machine according to claim 1, wherein a slotted capsule arranging mechanism is provided comprising a slotted capsule containing cylinder, means for moving the slotted capsules in the cylinder, means for extracting from the cylinder those slotted capsules which do not stand on their edges, means for rejecting those capsules which stand in inverted positions, means for accepting those slotted capsules which stand in the desired upright position, means for turning the accepted slotted capsules over on their edges, means for rotating the turned slotted capsules until the slots therein assume predetermined angular positions, a receiving and guide rail for engagement with the slots of the capsules and guidance of the slotted capsules, and a magazine into which the said rail guides the slotted capsules.

11. An automatic machine according to claim 1, comprising an upper affixing die and a lower affixing die, a capsule holder slidably mounted on the upper die and having a hole for accommodating the capsule, a spring provided on the holder and acting frictionally on the die for slidably attaching the holder to the die, and a spring provided on the holder for yieldingly holding the capsule in the said hole.

12. An automatic machine according to claim 1, comprising means for carrying a stock of arranged capsules, transferring means for transferring capsules singly from the stock to the capsule feed member, means for driving the said transferring means, a stationary affixing die, a movable affixing die, means for actuating the movable die, mechanical means for arranging capsules and replenishing the said stock, and means for driving the said capsule arranging and replenishing means independently of the means for driving the transferring means and the means for actuating the movable die and the means for operating the feed member, whilst the said means for driving and means for actuating and means for operating are inoperative.

13. An automatic machine according to claim 1, comprising a lower immovable affixing die, an upper movable affixing die, a capsule holder slidable on the upper vertically movable affixing die above the lower immovable die, a machine frame carrying the said two dies, a stop surface on the machine frame for sliding the capsule holder downwards on the upper vertically movable affixing die when it ascends, and a disc holding rim on the lower immovable die for also sliding the capsule holder upwards on upper vertically movable affixing die when it descends and for forming a junction with said holder during the affixing of the capsule and disc by the said dies.

14. An automatic machine for affixing the capsule and disc of a seal to a string placed in the machine, comprising a capsule transport arm, a semicircular stop thereon for positioning the capsule on the arm and a capsule guide rail piece extending through the said stop for guiding the capsule into position on the conveyor arm.

15. An automatic machine according to claim 14, comprising pressure means for yieldingly pressing the capsules onto the guide rail and guide piece.

16. An automatic machine for affixing the capsule and disc of a seal to a string placed in the machine, comprising capsule and disc affixing dies, a capsule holder slidably and non-rotatably mounted on one of the dies, there being a gap in the said capsule holder for lateral insertion of the capsule into the holder.

17. An automatic machine according to claim 16, wherein springs are provided on the capsule holder for yieldingly pressing the capsule laterally and thereby frictionally retaining the capsule in position in the capsule holder.

18. An automatic machine for affixing the capsule and disc of a seal to a string placed in the machine, comprising two cooperating affixing dies, a capsule feed lever for feeding the capsule to one of the dies, a centre for the capsule feed lever to oscillate about, a disc feed lever for feeding the disc to the other of said dies, and a centre in alignment with the first named centre for the disc feed lever to oscillate about, in combination with means for oscillating the said feed levers simultaneously in opposite directions about overlapping arcs which are of equal length and are concentric with each other.

19. An automatic machine for affixing the capsule and disc of a seal to a string placed in the machine comprising two cooperating affixing dies, capsule and disc supply holders, a reciprocatory feed member for feeding capsules to one of the dies, and a second reciprocatory feed member for feeding discs to the other die, the said dies being situated in a free space which is unoccupied by the capsule and disc supply holders and is normally unoccupied by the said feed members and accommodates during affixion the article to which the string is attached.

OSCAR SCHREYER.